United States Patent [19]

Chung

[11] 4,356,635
[45] Nov. 2, 1982

[54] CENTERING DEVICE

[76] Inventor: Hun Hwei Chung, No. 2-16, Lane 81, Chung Shen Rd., Feng Yuan, Taiwan

[21] Appl. No.: 219,989

[22] Filed: Dec. 24, 1980

[51] Int. Cl.³ .............................................. B27G 23/00
[52] U.S. Cl. ............................... 33/185 R; 33/172 D; 33/191
[58] Field of Search ...................... 33/185, 191, 172 D, 33/169 C

[56] References Cited
U.S. PATENT DOCUMENTS 2,725,638  12/1955  Sykes ................................. 33/185 R

*Primary Examiner*—Harry N. Haroian
*Attorney, Agent, or Firm*—Tak Ki Sung

[57] ABSTRACT

A centering device for locating a center line of a workpiece to be aligned with the center line of a milling cutter along the direction of cut in a horizontal milling machine. The device comprises a centering pointer and an aligning fixture to be used in combination with a dial indicator. The centering pointer is mounted onto the aligning fixture adapted to be attached to the milling cutter in aligning the center lines, wherein the center line of the milling cutter along the direction of cut is represented by the centering pointer and the center line of the workpiece can be brought to coincide therewith.

3 Claims, 6 Drawing Figures

CENTERING DEVICE

DESCRIPTION OF THE PRIOR ART

In co-pending U.S. patent application Ser. No. 06/110,609 filed Jan. 9, 1980, a centering device having a centering pointer and a centering block for aligning the center line of a work-piece with the center axis of the spindle of a manufacturing machine without the need for marking the workpiece prior to the set up of the workpiece to be cut is disclosed. The centering block is adapted to be mounted onto the workpiece in the proposed aligning process. The device of aforesaid application is only good for use in a machine having a vertical spindle such as a vertical milling machine or a drill press.

The present invention proposes a different centering device for use in a machine having a horizontal spindle such as a horizontal milling machine. The device according to the present invention is capable of aligning the center line of a workpiece with the centerline of the milling cutter along the direction of cut without the need for prior marking the workpiece.

BACKGROUND OF THE INVENTION

A commonly accepted practice in cutting a workpiece in a horizontal milling machine is such that the workpiece is marked with reference lines according to the blue print, and then the workpiece is mounted onto the worktable with the marked reference lines properly aligned with the center axis of the worktable or with the center line of the milling cutter along the direction of cut.

The aforesaid practice requires skill in the marking and aligning processes. It is not only tedious but also inaccurate. To assure the accuracy of the alignment, an optical instrument is sometimes used but it is expensive.

The present invention discloses a novel centering device to be used for aligning a center line of a workpiece with the center line of the milling cutter along the direction of cut in a horizontal milling machine without the need for prior marking the workpiece.

The construction, features and objects of the present invention will be more fully understood from the following detailed description taken in conjunction with the accompanying drawings.

DETAILED DESCRIPTION OF THE INVENTION

Figures 1, 2:
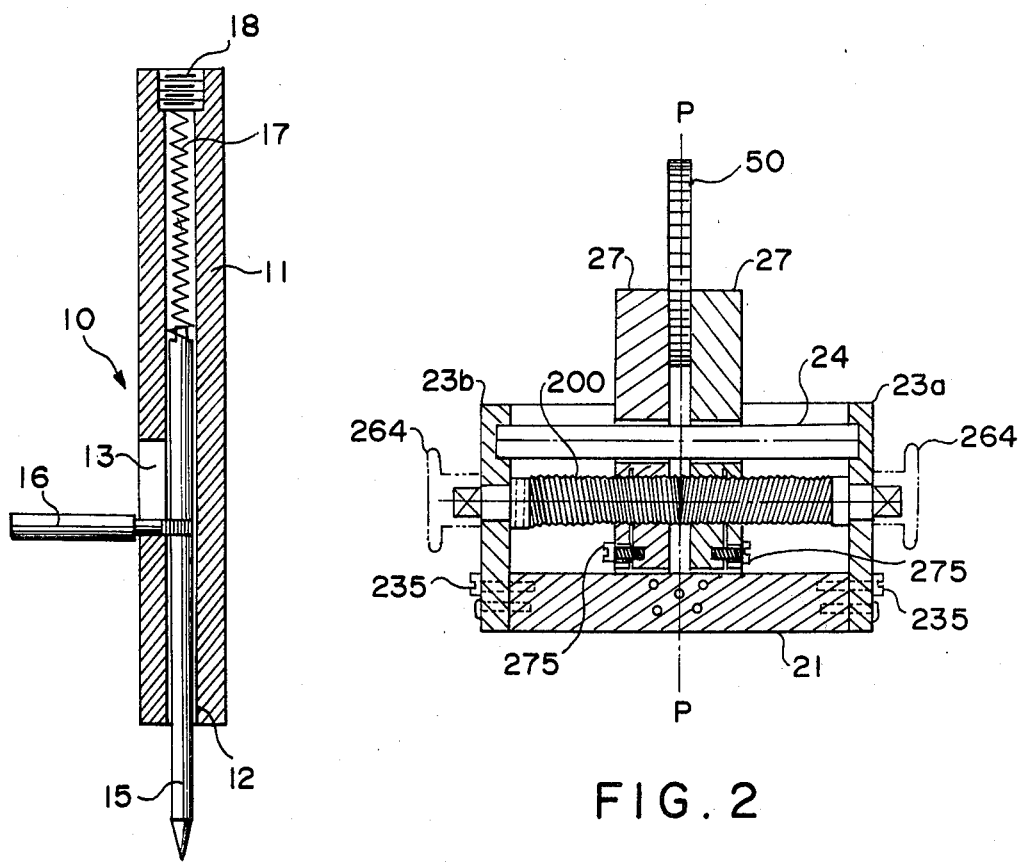
FIG. 1 is a cross sectional view of the centering pointer according to the present invention.
FIG. 2 is a longitudinal cross sectional view of the aligning fixture according to the present invention.

In FIG. 1, there is shown a centering pointer generally indicated at 10, which comprises a hollow holder 11 having a through hole 12, a needle 15 having a finely polished lower point, a coil spring 17 and a plug 18; said needle 15 being slidably inserted into the hole 12 of the holder 11 and provided with a lever 16 fixed thereon; said lever 16 extending through an elongated opening 13 provided in the wall of the holder 11 and capable of moving along said elongated opening 13; said coil spring 17 being disposed on the top of the needle 15 in the hole 12 of the holder 11 with its upper end retained by the plug 18 mounted on the upper end of the holder 11, and thus urging the needle 15 downwardly.

Figure 3:
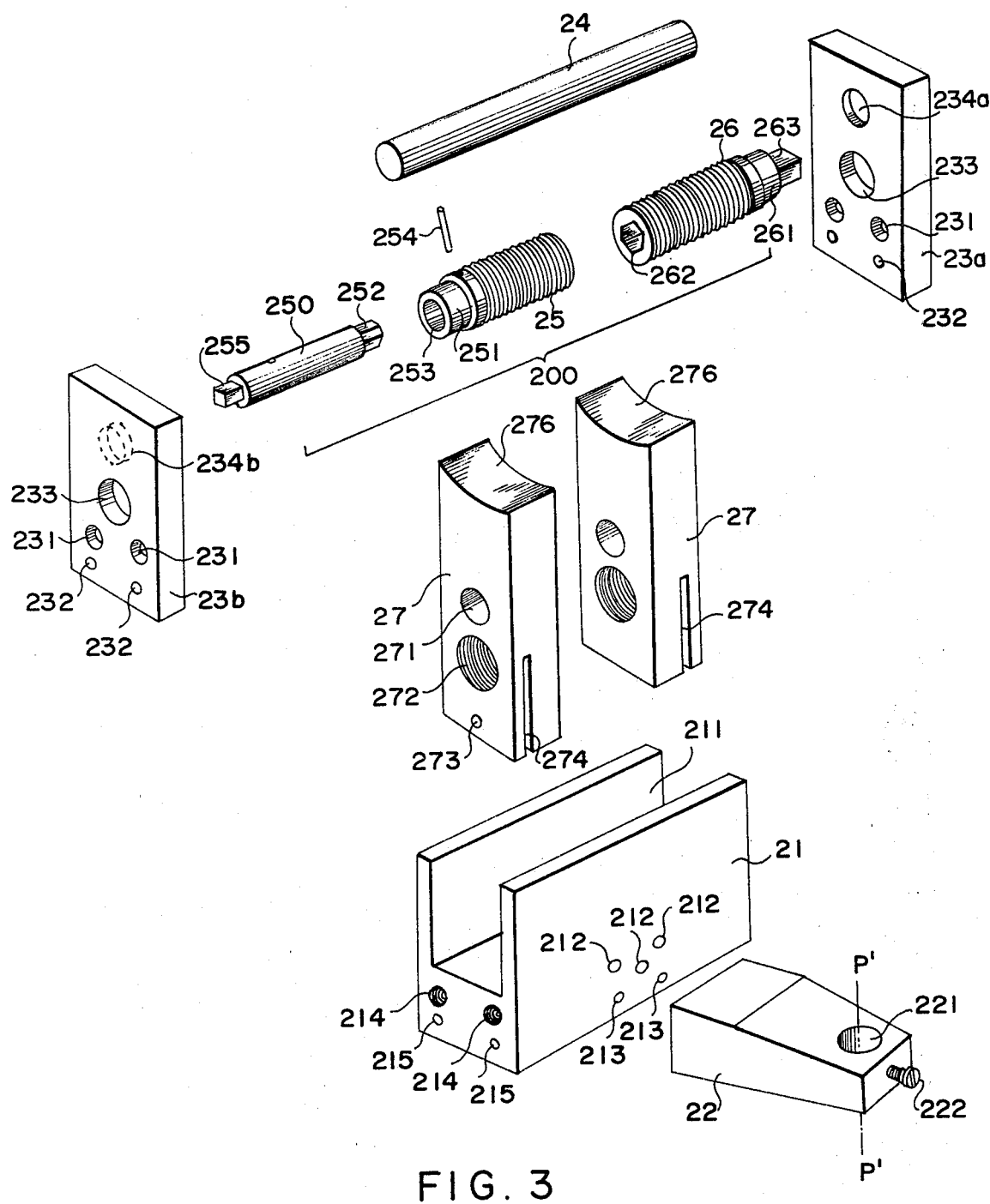
FIG. 3 is an oblique, perspective, exploded view of the aligning fixture as shown in FIG. 2, showing each component thereof.
Figure 4:
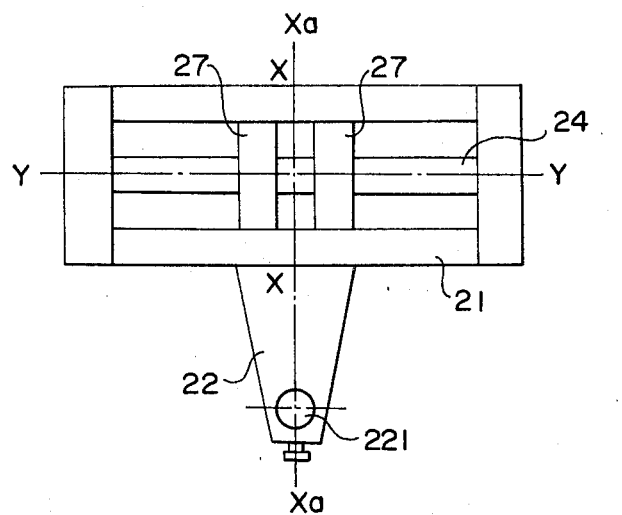
FIG. 4 is a schematic drawing of the aligning fixture of the present invention, viewed from the top.

The aligning fixture as shown in FIGS. 2, 3 and 4 comprises a base 21, an arm 22 for holding the centering pointer 10, end plates 23a and 23b, a slide bar 24, a leadscrew assembly 200, and a pair of holding blocks 27. The base 21 is provided with an elongated channel 211 having a longitudinal center line Y—Y (as shown in FIG. 4), and the end plates 23a and 23b fixedly mounted at the ends thereof. The end plates 23a and 23b are provided with blind holes 234a and 234b respectively for supporting the ends of a slide bar 24 therein, and through holes 233 for receiving the leadscrew assembly 200. Referring to FIG. 3, the leadscrew assembly comprises a screw rod 26 having a righthand screw thread formed thereon, a screw sleeve 25 having a lefthand screw thread formed thereon, a drive shaft 250 inserted through said screw sleeve 25; said screw rod 26 having a journal 261 at one end to be rotatably supported in the hole 233 in the end plate 23a, a drive shank 263 extending from the journal 261, and a hexagonal hole 262 at the other end; said screw sleeve 25 having a journal 251 at one end to be rotatably supported in the hole 233 in the end plate 23b, and a through hole 253, said drive shaft 250 being inserted through said screw sleeve 25 and having a hexagonal shank 252 at one end to engage the hexagonal hole 262 in the screw rod 26, said drive shaft 250 being fixedly secured to the screw sleeve by a dowel pin 254 and having a drive shank 255 at the other end extending beyond the end plate 23b. The leadscrew assembly 200 can be rotated by hand with a suitable handle 264 or 256 shown in imaginary lines in FIG. 2. The slide bar 24 and the leadscrew assembly 200 are mounted in parallel with each other in between the two end plates 23a and 23b, which are mounted onto the base 21 with cap screws 235 passing through the holes 231 and screwed into the threaded holes 214 in the base 21.

The holding blocks 27, as shown in FIGS. 2 and 3, are each provided with a through hole 271 in which the slide bar 24 is slidably passed, a screw-threaded hole 272 and a cut-in 274. Each holding block 27 is further provided with an arcuate surface 276 on top to conform with the periphery of the spindle of the milling machine on which the milling cutter is mounted. The screw-threaded hole 272 in one holding block 27 is adapted to be engaged with the screw thread on the screw rod 26 and that in the other holding block 27 with the screw sleeve 25, so that each holding block is mounted onto the respective screw rod or screw sleeve, having the slide bar 24 passing through the holes 271. The shape of the lower part of each holding block 27 is so finished to conform with the channel 211 so that the holding blocks 27 are capable of sliding longitudinally along the channel 211 without wobbling, in such a manner that they move toward each other when the leadscrew assembly 200 is rotated in one direction, and move away from each other when the leadscrew assembly is rotated in the opposite direction.

The holding blocks 27 are each further provided with a screw 275 (FIG. 2) passing through a clear hole 273 (FIG. 3), across the cut-in 274 and screwed into a screw-threaded hole (not shown) in the holding block 27. By tightening the screws 275 the screw-threaded engagement between the leadscrew assembly 200 and the holding blocks 27 is tightened to prohibit the movement of the holding blocks, or to lock the holding blocks 27 on the leadscrew assembly 200.

The base 21 is further provided with an arm 22 fixedly mounted on one side thereof. Said arm 22 is provided with a hole 221 in which centering pointer 10 can be vertically inserted. A lock screw 222 is provided to firmly secure the centering pointer 10 onto the arm 22.

The holes 232, 215 and 213 shown in FIG. 3 are for receiving the dowels, not shown, which reinforce the connection of the end plates 23a, 23b with the base 21, and that of the arm 22 with the base 21.

Figure 5:
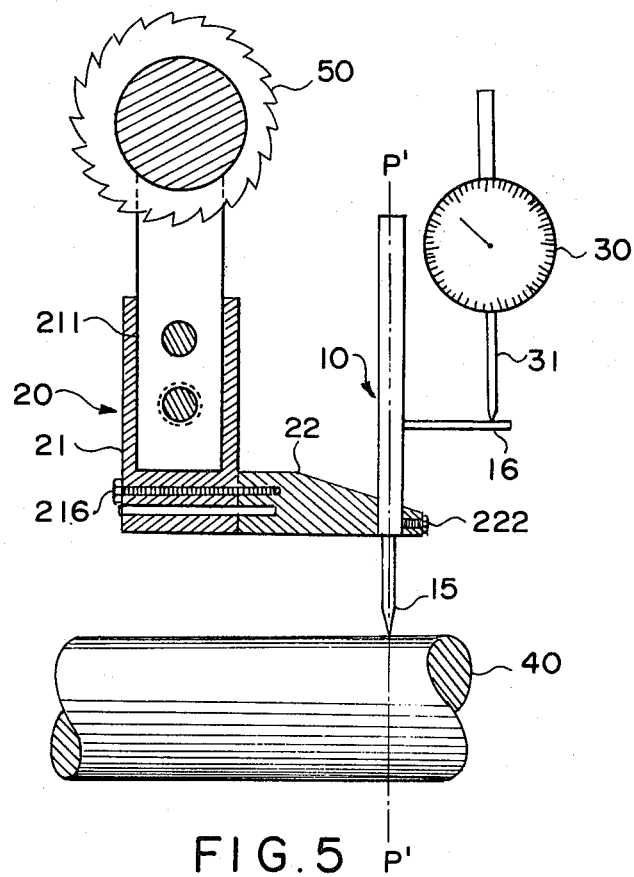
FIG. 5 is a schematic drawing showing the centering device of the present invention in use.

In FIG. 4 there is shown schematically the positional relation between the arm 22 and holding blocks 27. The arm 22 is fixedly mounted at one side of the base 21 of the aligning fixture, with the center line $X_a$—$X_a$ of the arm when viewed from top perpendicular to the longitudinal center line Y—Y of the base 21 of the aligning fixture, said center line $X_a$—$X_a$ coincides with the traverse center line X—X of the base 21 of the aligning fixture. The arm 22, as shown in FIGS. 3 and 5 is mounted onto the base 21 with the capscrews 216 passing through the holes 212 in the base 21 and screwed into the corresponding threaded holes (not shown) in the arm 22. In the meantime, the screw threads of the screw rod 26 and the screw sleeve 25 are of the same pitch and the holding blocks 27 mounted on said screw rod 26 and screw sleeve are so disposed that they meet at the traverse center line X—X when the leadscrew assembly 200 is rotated to draw the two together, and each moves an equal distance from the traverse center line X—X when the leadscrew assembly 200 is rotated in the opposite direction to move the two apart. In other words, when a milling cutter 50 is placed and clamped in between the two holding blocks 27, the center line of the milling cutter P—P (FIG. 2) along the direction of cut always automatically coincides with the traverse center line X—X of the base 21 of the aligning fixture, and is consequently aligned with the center line $X_a$—$X_a$ of the arm 22 having a centering pointer 10 whose center axis P'—P' (FIG. 6) coincides with a vertical plan passing through the traverse center line X—X or $X_a$—$X_a$. As a result, the center axis P'—P' of the centering pointer 10 coincides with the vertical plan passing through the center line of the milling cutter P—P along the direction of cut.

The application of the centering device of the present invention will now be described as follows.

Figure 6:
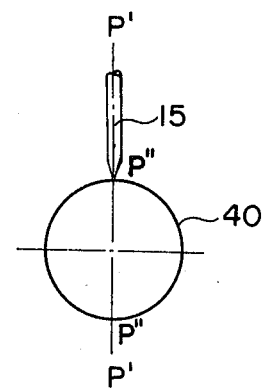
FIG. 6 is a schematic drawing showing the alignment of the needle of the centering pointer with the vertical center line of the workpiece.

Referring to FIGS. 5 and 6, there is shown a cylindrical workpiece 40 on which a longitudinal slot, not shown, is to be cut. Firstly, the workpiece 40 is mounted onto the worktable of the horizontal milling machine, not shown, with its axis parallel to the surface of the worktable and perpendicular to the axis of the spindle of the milling machine. Secondly, the milling cutter 50 is clamped with the holding blocks 27 of the aligning fixture 20 as shown in FIG. 2, with the arm 22 extending parallel to the surface of the worktable or the axis of the workpiece 40. Thirdly, the centering pointer 10 is mounted onto the arm 22 as shown in FIG. 5, and held tightly with the lock screw 222. Fourthly, the dial indicator 30 is set in a suitable place to have the lower point of the plunger 31 of the dial indicator 30 to come into contact with the lever 16 as shown in the drawing. Fifthly, the worktable is moved up slowly till the upper part of the workpiece 40 comes into contact with the point of the needle 15 of the centering pointer 10; then the worktable is moved back and forth.

The movement of the hand of the dial indicator while the worktable is moved back and forth, is monitored and the maximum movement marked. The worktable is stopped at the position where the hand of the dial indicator 30 is at the maximum movement. At this position the point of the needle 15 of the centering point is at the highest position of the upper part of the workpiece, which means the center axis P'—P' of the centering pointer 10 coincides with the vertical center line P''—P'' of the workpiece 40 as shown in FIG. 6. Since the vertical center line P''—P'' of the cylindrical workpiece 40 passes through the highest point of the upper part, therefore, the center line P''—P'' of the workpiece 40 is aligned with the center line P—P of the milling cutter along the direction of cut.

As soon as the center lines have been aligned, the worktable can be lowered and the aligning fixture 20 can be removed from the milling cutter, and the cutting work can be started.

The device according to the present invention can be made at reasonably low cost. It is easy to use, and also provides practical accuracy.

I claim:

1. A centering device for use in a tool machine having a horizontal spindle wherein a circular milling cutter is mounted for cutting a cylindrical workpiece, comprising:

an aligning fixture having a base provided with an elongated channel along a longitudinal center line, a pair of holding blocks slidably disposed in said channel of said base, said holding blocks mounted on a leadscrew capable of moving said pair of holding blocks towards each other to meet at a center position of said base when said leadscrew is turned in one direction and each moving apart an equal distance from said center position of said base when said leadscrew is turned in the opposite direction each of said holding blocks being provided with a cut-in and a lock screw adapted to lock the holding block on said leadscrew when said lock screw is tightened, an arm firmly fixed onto one side of said base, said arm having a center line perpendicular to said longitudinal center line of said base and passing through said center position of said base; and a centering pointer having a needle slidably held within a hollow holder and resiliently urged outwardly by a spring in said hollow holder, said needle being provided with a lever perpendicularly fixed thereto and capable of moving with said needle, said centering pointer being mounted onto said arm in said aligning fixture with said needle passing through and being perpendicular to said center line of said arm.

2. A centering device as claimed in claim 1, wherein said leadscrew is provided with a righthand screw thread in one half of its length and a lefthand screw thread in the other half, both screw threads being of the same pitch.

3. A centering device as claimed in claim 1, wherein said holding blocks are each provided with an arcuate surface on the top thereof, said arcuate surface being made to conform with the periphery of said horizontal spindle of the tool machine.

* * * * *